(12) United States Patent
Barnetson et al.

(10) Patent No.: US 9,686,828 B2
(45) Date of Patent: Jun. 20, 2017

(54) LED RETROFIT LAMP WITH A STRIKE BARRIER

(71) Applicant: Lunera Lighting, Inc., Anaheim, CA (US)

(72) Inventors: Don Barnetson, San Jose, CA (US); Joel Snook, Grass Valley, CA (US); Junyun Wang, Palo Alto, CA (US); Ardeshir Esmaeili, San Jose, CA (US)

(73) Assignee: Lunera Lighting, Inc., Santa Clara, CA (US)

( * ) Notice: Subject to any disclaimer, the term of this patent is extended or adjusted under 35 U.S.C. 154(b) by 0 days.

(21) Appl. No.: 14/304,964

(22) Filed: Jun. 15, 2014

(65) Prior Publication Data

US 2015/0366008 A1 Dec. 17, 2015

(51) Int. Cl.
*H05B 33/08* (2006.01)
*F21K 99/00* (2016.01)
*F21Y 101/00* (2016.01)
*F21K 9/27* (2016.01)

(52) U.S. Cl.
CPC ..... *H05B 33/0824* (2013.01); *H05B 33/0803* (2013.01); *H05B 33/0806* (2013.01); *H05B 33/0809* (2013.01); *F21K 9/27* (2016.08); *F21Y 2101/00* (2013.01); *Y02B 20/386* (2013.01)

(58) Field of Classification Search
CPC ............ H05B 33/0803; H05B 33/0809; H05B 41/3924
See application file for complete search history.

(56) References Cited

U.S. PATENT DOCUMENTS

| 3,573,606 | A | * | 4/1971 | Hart | ........................ G05F 3/06 |
| | | | | | 323/248 |
| 3,968,407 | A | * | 7/1976 | Wilson | ............................. 361/55 |
| 4,165,475 | A | * | 8/1979 | Pegg et al. | ..................... 315/99 |
| 4,878,010 | A | * | 10/1989 | Weber | ............................ 323/300 |
| 5,572,415 | A | * | 11/1996 | Mohan | ............................ 363/61 |
| 5,831,349 | A | | 11/1998 | Weng | |
| 6,356,038 | B2 | * | 3/2002 | Bishel | ............................ 315/291 |
| 7,872,428 | B1 | * | 1/2011 | Papanicolaou | ............... 315/291 |
| 8,294,379 | B2 | | 10/2012 | Liu | |
| 8,373,547 | B2 | | 2/2013 | Benya | |
| 8,638,045 | B2 | | 1/2014 | Kunst | |

(Continued)

FOREIGN PATENT DOCUMENTS

| CN | 2802894 Y | 8/2006 |
| CN | 202524601 U | 11/2012 |
| CN | 203036999 U | 7/2013 |

*Primary Examiner* — Vibol Tan
(74) *Attorney, Agent, or Firm* — Henry J. Cittone; Cittone & Chinta LLP

(57) ABSTRACT

A LED retrofit lamp for replacement of fluorescent lamp or tube driven by fluorescent ballast is provided. The retrofit lamp is compatible with the fluorescent ballast that requires the presence of a barrier for striking an arc voltage. The present invention provides a strike barrier—a controllable barrier that does not allow current conduction until a threshold voltage is reached. When a current above the threshold voltage passes through the strike barrier, the circuit latches and allows conduction at normal voltage. The present invention also provides a circuit that replicates the cathode heater resistance of a fluorescent lamp to rapid start and programmed start ballast.

8 Claims, 2 Drawing Sheets

(56) References Cited

U.S. PATENT DOCUMENTS

| | | | |
|---|---|---|---|
| 2007/0039946 A1* | 2/2007 | Parkhi et al. | 219/501 |
| 2007/0097484 A1* | 5/2007 | Libretto | G02F 1/163 |
| | | | 359/275 |
| 2013/0113375 A1 | 5/2013 | Leung | |
| 2013/0221867 A1 | 8/2013 | Deppe | |
| 2013/0234600 A1* | 9/2013 | Park | 315/122 |
| 2013/0293122 A1 | 11/2013 | Huynh | |

\* cited by examiner

LED RETROFIT LAMP WITH A STRIKE BARRIER

FIELD OF THE INVENTION

The present invention relates to a retrofit light-emitting diode (LED) lamp suitable for operation with ballast, and more particularly to a LED retrofit lamp with a strike barrier.

BACKGROUND

The development of LED lighting technology paved the way for replacement of fluorescent lamps running on the ballast with the LED retrofit lamps. The replacement of fluorescent lamps with LED lamps requires a considerable investment in term of labor cost for removing the existing fluorescent fixtures and replacing them with the LED lamps.

Various LED replacement lamps were proposed that are adaptable to work with the ballast and thus avoiding the need for replacing ballast fixtures. These LED replacement lamps operate on the AC voltage provided by the ballast. However, these LED replacement lamps are not compatible with all kinds of ballasts, especially older models. Normally a fluorescent tube does not conduct current until an arc voltage is reached and starts conducting at normal rate once the arc voltage is breached. The LED lamp shows no such behavior and starts conducting and turning on as soon as a voltage is applied. However certain ballasts either look for a barrier or have a sub-circuit that depends on a barrier being present. Thus these modern LED replacement lamps are incompatible with certain ballast types.

In order to overcome the aforementioned disadvantages, the present invention provides a LED retrofit lamp that provides a strike barrier to the fluorescent ballasts.

BRIEF SUMMARY OF THE INVENTION

In a first aspect of the present invention, a method for providing strike barrier in the LED retrofit lamp is provided. The strike barrier allows the retrofit LED lamp to have the same behavior as that of the fluorescent lamp. The strike barrier provides a controllable barrier that does not allow the current conduction, but once breached a circuit that latches and allows conduction at a normal operating voltage. The strike barrier comprises a triode for alternating current (TRIAC) whose gate terminal is connected to a Zener diode placed in reverse orientation. When the current is applied to the Zener diode it prevents the current to conduct in the reverse direction until a threshold value is reached. Once the threshold value is reached the Zener diode starts conducting the current to the gate terminal of the TRIAC. The current at the gate terminal triggers on the TRIAC resulting in the conduction of current to the bridge rectifier. The strike value of the controllable barrier can be tuned by choosing the value of the Zener diode of the TRIAC.

In a second aspect of the present invention, a dual bridge structure in the circuit of LED retrofit lamp is provided. The dual bridge structure replicates the cathode heater resistance of a fluorescent lamp operated with rapid start and programmed start ballasts. A resistor having the rating equivalent to the cathode heater is placed in front of the bridge rectifier. The resistor is placed in series to the bridge rectifier such that the resistor provides an alternate path to the waveform coming from the ballast.

BRIEF DESCRIPTION OF THE DRAWINGS

The preferred embodiment of the invention will hereinafter be described in conjunction with the appended drawings provided to illustrate and not to limit the scope of the invention, wherein like designation denote like element and in which.

DETAILED DESCRIPTION OF THE EMBODIMENTS

In the following detailed description of embodiments of the invention, numerous specific details are set forth in order to provide a thorough understanding of the embodiment of invention. However, it will be obvious to a person skilled in art that the embodiments of invention may be practiced with or without these specific details. In other instances well known methods, procedures and components have not been described in details so as not to unnecessarily obscure aspects of the embodiments of the invention.

Furthermore, it will be clear that the invention is not limited to these embodiments only. Numerous modifications, changes, variations, substitutions and equivalents will be apparent to those skilled in the art, without parting from the spirit and scope of the invention.

In embodiments of the present invention, Rapid Start and Programmed Start Florescent ballasts preheat the cathodes prior to generating a high enough voltage to strike and arc along the length of the fluorescent tube. The tube is non-conductive until this arc voltage (typically 300-600V) is reached, then the tube conducts in the range of 100V. In a simple LED retrofit, the LEDs show no such behavior, conducting and turning on as soon as a voltage is applied. However some ballast either look for a barrier or have sub-circuits that depend on a barrier being present, thus making the LED lamp incompatible with the fluorescent ballast.

An embodiment of the present invention provides a LED retrofit lamp that contains a circuit called a "strike barrier". The strike barrier allows the LED retrofit lamp to have the same behavior as that of a fluorescent lamp. The strike barrier is a controllable barrier that does not allow current conduction till a threshold voltage, but when breached by a threshold voltage, the circuit latches and allows the conduction at normal operating voltage. The strike value of the barrier can be tuned by choosing the value of the Zener diode on the gate of the TRIAC.

Another embodiment of the present invention provides an improved circuit that replicates the cathode heater resistance of a fluorescent lamp to rapid start and programmed start ballasts. The improved circuit comprises a target resistor in front of the bridge rectifier. The resistance value of the resistor can vary from 10 ohm to 30 ohm. The resistor provides the ballast with an alternate path.

Figure 1:
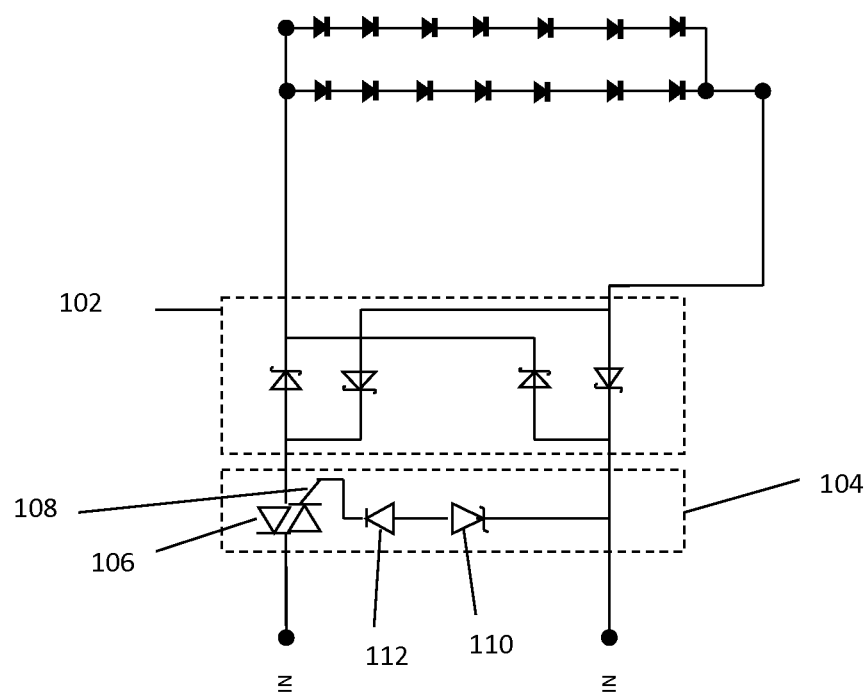
FIG. 1 illustrates a LED retrofit lamp circuit with a bridge rectifier and a strike barrier in accordance with an embodiment of the present invention.

FIG. 1 illustrates a LED retrofit lamp circuit with a bridge rectifier and a strike barrier in accordance with an embodiment of the present invention. The circuit comprises a bridge rectifier 102 and a strike barrier 104. The bridge rectifier 102 converts the alternating-current (AC) voltage supplied from the ballast to the DC voltage required for the LED array. The bridge rectifier is made of Schottky diodes. Since the fluorescent tube works of the principle of arc voltage wherein the ballast preheats the cathode prior to generating a high enough voltage to strike and arc along the length of the fluorescent tube. Therefore the ballast designed for the fluorescent tube either looks for a barrier or have a sub-circuit that depends on a barrier being present. The LED retrofit lamp does not require an arc voltage and start operating as soon as a voltage is applied. However since LED retrofit lamps or tubes are designed to operate with the existing circuit of fluorescent tube, therefore the LED retrofit tube must provide a barrier for the existing ballast. The strike barrier 104 of the circuit provides a barrier to the ballast. The strike barrier 104 allows the LED retrofit lamp to have a same behavior as that of the fluorescent tube. The strike barrier 104 provides the LED retrofit tube a controllable barrier that does not allow current conduction, but once breached the circuit latches and allows conduction at normal operating voltage. The strike barrier comprises a TRIAC 106 that can conduct current in either direction when it is turned on. The main terminals of the TRIAC 106 are connected to a first connection terminal of the ballast at one end and to the bridge rectifier 102 at the second end, such that the TRIAC 106 conducts the current from the ballast to the bridge rectifier 102 once it is turned on. The TRIAC 106 gets conductive when a triggering current is applied to its gate terminal 108. The gate terminal 108 of the TRIAC 106 is connected to the second connection terminal of the ballast, such that the gate terminal 108 is in parallel to the bridge rectifier 102. A Zener diode 110 and a diode 112 are present on the line connecting the gate terminal 108 with second connection terminal of the ballast output. The Zener diode 110 is placed in reverse orientation such that it will not allow the current to conduct to the gate terminal 108 of TRIAC 106 until the breakdown voltage is reached. The Zener diode 110 and the TRIAC 106 collectively perform the function of strike barrier 104. At the initial start up of the lamp, the Zener diode 110 prevents the current to flow through it until a breakdown voltage is achieved. When the breakdown voltage is achieved the Zener diode 110 allows the current to flow from it and the current when reached to the TRIAC 106 triggers on the TRIAC and the current from the ballast input flows to the bridge rectifier 102.

In an embodiment of the present invention the bridge rectifier is made of schottky diodes.

Figure 2:
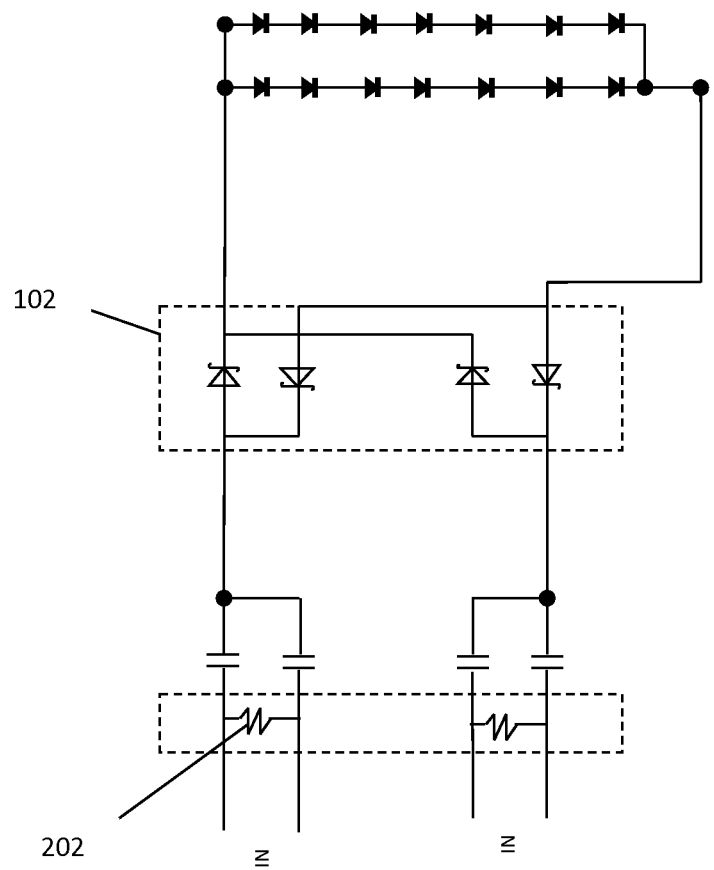
FIG. 2 illustrates a circuit for a LED lamp having cathode heater resistance replicated in accordance with an embodiment of the present invention.

In another embodiment of the present invention, a method to replicate the cathode heater circuit of a fluorescent lamp is provided. The conventional retrofit LED lamp uses resistor tuned to the same value as the hot cathode heater circuit, but the resistor results in wasted power as the arc current must also flow through them. When the LEDs are in a non-conductive state at a zero crossing of the ballast current, the cathode impedance is near infinite. When the LEDs are in a conductive state at the peak of a current cycle; circuit is able to conduct, but the impedance is nearly infinite in the opposite direction. The method of the present invention adds a resistance in front of the bridge rectifier. The resistor is placed at the input of the pluralities of pins, thus providing an alternate path to the ballast current. FIG. 2 illustrates a circuit for a LED lamp having cathode heater resistance replicated in accordance with an embodiment of the present invention. A resistor 202 is placed at both the input of the first connection terminal and second connection terminal of the ballast. The resistance of resistor 202 is equivalent to the cathode heater resistance. The resistance 202 provides an alternate path to the ballast voltage.

The foregoing merely illustrates the principles of the present invention. Other variations to the disclosed embodiments can be understood and effected by those skilled in the art in practicing the claimed invention from a study of the drawings, the disclosure, and the appended claims. In the claims, the word "comprising" does not exclude other elements or steps and the indefinite article "a" or "an" does not exclude a plurality. The mere fact that certain measures are recited in mutually different dependent claims does not indicate that a combination of these measures cannot be used advantageously. Any reference signs in the claims should not be construed as limiting the scope of the claims. Various modifications and alterations to the described embodiments will be apparent to those skilled in the art in view of the teachings herein. It will thus be appreciated that those skilled in the art will be able to devise numerous techniques which, although not explicitly described herein, embody the principles of the present invention and are thus within the spirit and scope of the present invention. All references cited herein are incorporated herein by reference in their entireties.

We claim:

1. A light-emitting diode retrofit lamp comprising:
   a plurality of pins that electrically connects a light-emitting diode lamp with a first terminal connection and a second terminal connection of a ballast;
   a bridge rectifier that converts an alternating current voltage generated by the ballast to a direct current voltage required for the light-emitting diode;
   a strike barrier placed between the plurality of pins and the bridge rectifier to prevent the flow of current to the bridge rectifier until a threshold voltage is reached, the strike barrier having a triode for alternating current (TRIAC) with main terminals connected to the first terminal connection of the ballast and the bridge rectifier and a gate terminal of the TRIAC is connected to an anode terminal of a Zener diode;
   wherein a cathode terminal of TRIAC is connected to a node between the second terminal connection of the ballast and the bridge rectifier; and
   the Zener diode placed in reverse orientation does not allow current to conduct to the gate terminal the triode for alternating current until the threshold voltage is reached.

2. The light-emitting diode retrofit lamp of claim 1 wherein main terminals of the triode for alternating current are connected to the bridge rectifier at a first end and the first terminal connection of the ballast at a second end.

3. The light-emitting diode retrofit lamp of claim 1 wherein a cathode terminal of the Zener diode is connected to the second terminal connection of the ballast.

4. The light-emitting diode retrofit lamp of claim 1 wherein the first end of the bridge rectifier is connected to the main terminal of the triode for alternating current and the second end of the bridge rectifier is connected to the second terminal connection of the ballast.

5. A light-emitting diode retrofit lamp comprising:
   a plurality of pins that electrically connects a light-emitting diode lamp with a first terminal connection and a second terminal connection of a ballast;
   a bridge rectifier that converts an alternating current voltage generated by the ballast to a direct current voltage required for the light-emitting diode;
   a strike barrier that prevents the flow of current from the plurality of pins to the bridge rectifier until a threshold voltage is reached, the strike barrier having a triode for alternating current and a Zener diode;
   a gate terminal of the triode for alternating current is connected to an anode terminal of the Zener diode;
   wherein the Zener diode conducts the current to the gate terminal of the triode for alternating current when a threshold voltage is applied from the ballast terminal.

6. The light-emitting diode retrofit lamp of claim 5 wherein the threshold voltage is equal to the arc voltage required for a normal fluorescent tube.

7. The light-emitting diode retrofit lamp of claim 5 wherein the threshold voltage can be tuned by varying the Zener diode rating.

8. A light-emitting diode retrofit lamp comprising:
- a plurality of pins that electrically connects a light-emitting diode lamp with a first terminal connection and a second terminal connection of a ballast;
- a bridge rectifier that converts an alternating current voltage generated by the ballast to a direct current voltage required for the light-emitting diode;
- a strike barrier that prevents the flow of current from the plurality of pins to the bridge rectifier until a threshold voltage is reached, the strike barrier having a triode for alternating current and a Zener diode;
- a gate terminal of the triode for alternating current is connected to an anode terminal of the Zener diode;
- wherein the strike barrier acts as a controllable barrier that allows the current conduction to the bridge rectifier only when the threshold voltage is applied from the ballast terminals.

\* \* \* \* \*